(12) United States Patent
Berger

(10) Patent No.: US 8,812,618 B2
(45) Date of Patent: Aug. 19, 2014

(54) INTELLIGENT ROUTING

(71) Applicants: Sony Corporation, Tokyo (JP); Sony Pictures Entertainment Inc., Culver City, CA (US)

(72) Inventor: Richard Berger, Culver City, CA (US)

(73) Assignees: Sony Corporation, Tokyo (JP); Sony Pictures Entertainment Inc, Culver City, CA (US)

(*) Notice: Subject to any disclaimer, the term of this patent is extended or adjusted under 35 U.S.C. 154(b) by 0 days.

(21) Appl. No.: 13/656,414

(22) Filed: Oct. 19, 2012

(65) Prior Publication Data

US 2013/0041983 A1    Feb. 14, 2013

Related U.S. Application Data

(63) Continuation of application No. 12/796,568, filed on Jun. 8, 2010, now Pat. No. 8,296,423.

(60) Provisional application No. 61/185,143, filed on Jun. 8, 2009.

(51) Int. Cl.
*G06F 15/16* (2006.01)
*G06F 7/04* (2006.01)

(52) U.S. Cl.
USPC .......................................... 709/217; 726/27

(58) Field of Classification Search
USPC ................................ 709/217, 223; 726/227
See application file for complete search history.

(56) References Cited

U.S. PATENT DOCUMENTS

| | | | |
|---|---|---|---|
| 7,707,643 B2 * | 4/2010 | DeMello et al. | 726/27 |
| 7,984,511 B2 * | 7/2011 | Kocher et al. | 726/27 |
| 7,996,913 B2 * | 8/2011 | Kocher et al. | 726/27 |
| 2003/0005078 A1 * | 1/2003 | Turicchi et al. | 709/217 |
| 2006/0026162 A1 * | 2/2006 | Salmonsen et al. | 707/10 |
| 2007/0204011 A1 * | 8/2007 | Shaver et al. | 709/219 |
| 2007/0233606 A1 * | 10/2007 | Zweig et al. | 705/57 |
| 2007/0276870 A1 * | 11/2007 | Rosenberg | 707/104.1 |
| 2008/0016196 A1 * | 1/2008 | MacMillan et al. | 709/223 |
| 2008/0060083 A1 * | 3/2008 | Koved et al. | 726/27 |
| 2008/0133767 A1 * | 6/2008 | Birrer et al. | 709/231 |
| 2008/0235746 A1 * | 9/2008 | Peters et al. | 725/111 |
| 2009/0138936 A1 * | 5/2009 | Biderman | 725/134 |
| 2010/0100899 A1 * | 4/2010 | Bradbury et al. | 725/29 |
| 2010/0261424 A1 * | 10/2010 | Mittal et al. | 455/3.01 |

* cited by examiner

*Primary Examiner* — Krisna Lim
(74) *Attorney, Agent, or Firm* — Procopio, Cory, Hargreaves & Savitch, LLP

(57) ABSTRACT

Routing of content, including: receiving a request to access a content item from a device; determining at least one of status, location, and format of the content item; and planning a procedure to fulfill the request to access the content item, wherein the procedure includes a method and a route.

20 Claims, 4 Drawing Sheets

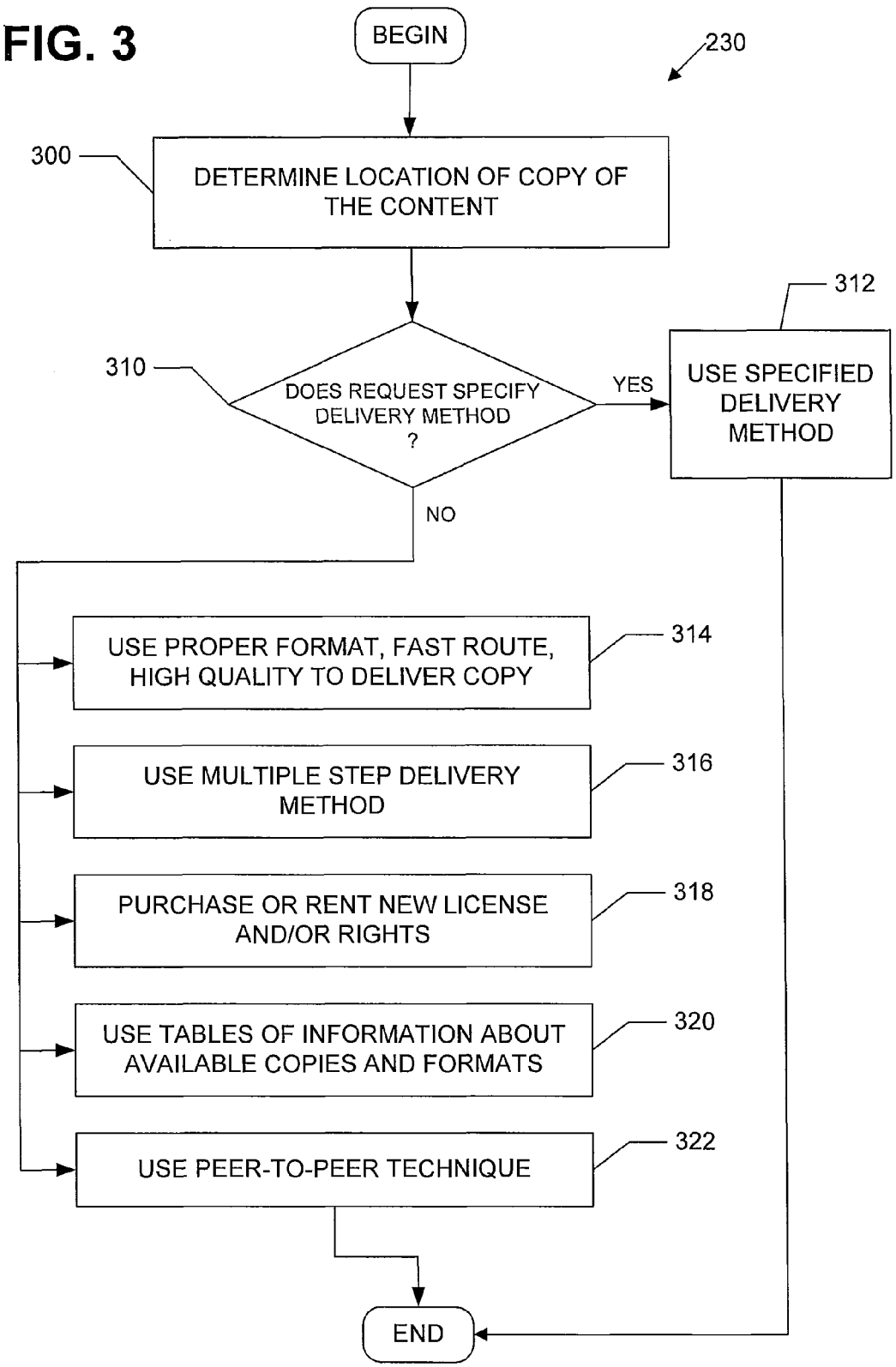

INTELLIGENT ROUTING

CROSS-REFERENCE TO RELATED APPLICATIONS

This application is a continuation application of a co-pending U.S. patent application Ser. No. 12/796,568, filed Jun. 8, 2010, entitled "Intelligent Routing", which claims the benefit of priority of U.S. Provisional Patent Application No. 61/185,143, filed Jun. 8, 2009, entitled "Intelligent Routing." The disclosures of the above-referenced application are incorporated herein by reference.

BACKGROUND

1. Field of the Invention

The present invention relates to accessing content, and more specifically, to intelligent routing of content to provide easy access to the content.

2. Background

Conventional techniques for accessing or selecting content for which rights to that content are owned by a user are not well suited for easy and instant access. Typically, the techniques require the user to perform a number of separate actions, which may have difficult-to-use or unpopular user interfaces.

SUMMARY

Embodiments of the present invention provide for automatically routing content.

In one implementation, a method of routing content is disclosed. The method includes: receiving a request to access a content item from a device; determining at least one of status, location, and format of the content item; and planning a procedure to fulfill the request to access the content item, wherein the procedure includes a method and a route.

In another implementation, a content routing system is disclosed. The system includes: a user interface; a local media library; and a media library manager configured to: receive a request from a user using the user interface to access a content item; determine at least one of status, location, and format of the content item; and plan a procedure to fulfill the request to access the content item, wherein the procedure includes a method and a route.

In another implementation, a computer-readable storage medium storing a computer program for automatically routing content is disclosed. The computer program comprising executable instructions that cause a computer to: receive a request to access a content item from a device; determine at least one of status, location, and format of the content item; and plan a procedure to fulfill the request to access the content item, wherein the procedure includes a method and a route.

Other features and advantages of the present invention will become more readily apparent to those of ordinary skill in the art after reviewing the following detailed description and accompanying drawings.

BRIEF DESCRIPTION OF THE DRAWINGS

FIG. 3 provides more detailed steps involved in the planning of efficient method and route to fulfill the request to access the content item.

DETAILED DESCRIPTION

Implementations as disclosed herein provide for intelligent routing of content to provide easy access to the content across multiple devices. After reading this description it will become apparent how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention.

Figure 1:
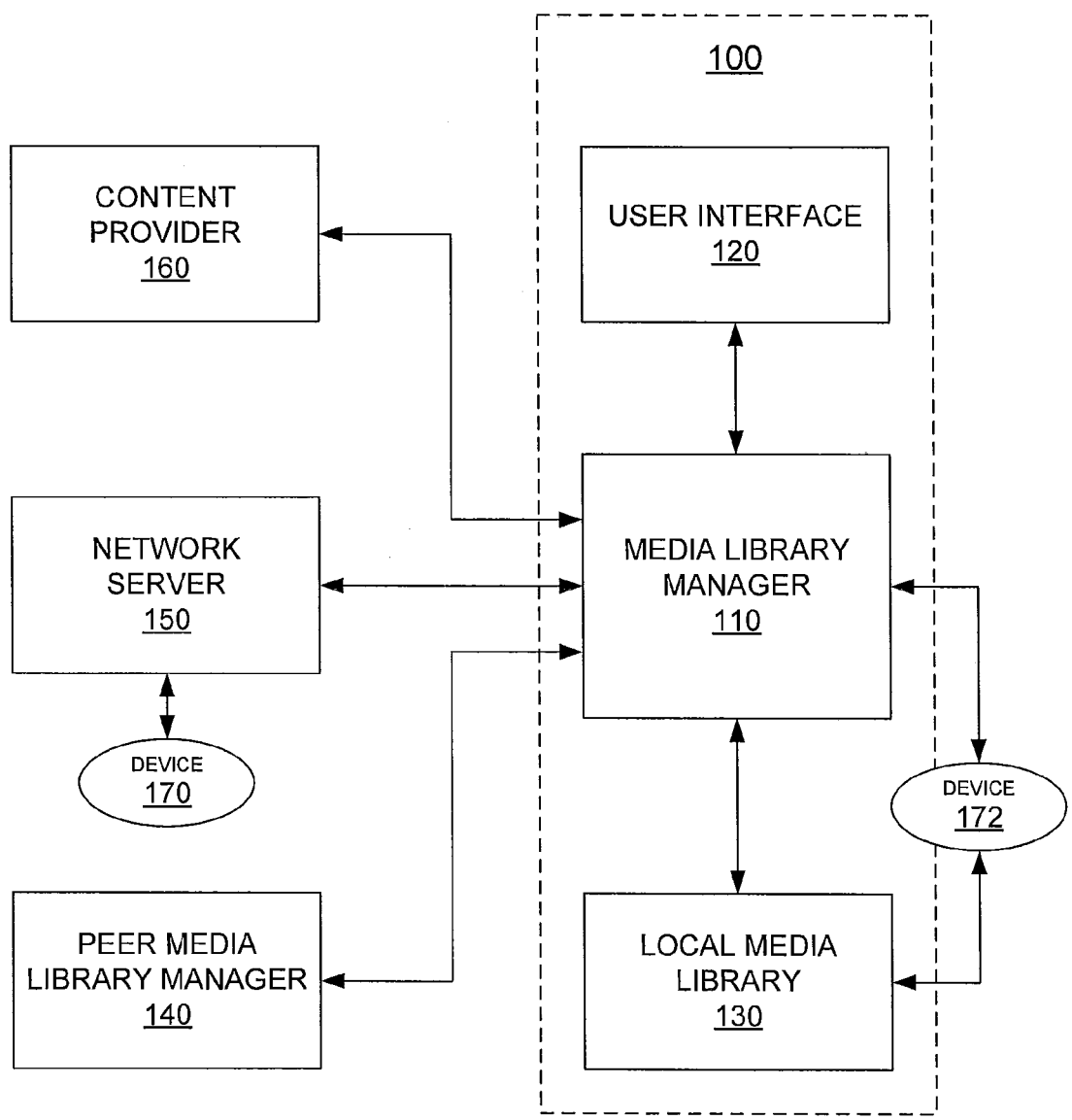
FIG. 1 is a block diagram of a content routing system in accordance with one implementation of the present invention

FIG. 1 is a block diagram of a content routing system 100 in accordance with one implementation of the present invention. The content routing system 100 includes a media library manager 110, a user interface 120, and a local media library 130. The content routing system 100 also interfaces with a peer media library manager 140, a network server 150, and a content provider 160. In some implementations, the local media library 130 may not be organized separately from the media library manager 110. Instead, as long as the media library manager 110 can find and identify the content items and provide access to them, the items do not need to be in a separate library.

In one implementation, the media library manager 110 is implemented as a local media player and/or library management software application. In this implementation, the media library manager 110 provides views of rights to content that are available to the user, such as locally on the home network of the user or online in the cloud (e.g., accessible through the Internet). When content is selected and requested for access (e.g., for viewing), the application selects the most efficient or desirable method for providing access to the content according to the request. For example, the application selects the content among following: (1) a local copy stored in the local media library 130; (2) trans-formatting a local copy between devices; (3) reacquiring a digital rights management (DRM) license to activate a local copy; or (4) downloading a new copy in a different format appropriate for a receiving device (e.g., 170, 172).

In the illustrated implementation of FIG. 1, a user can access content items through general requests and allow the system 100 to manage fulfilling the request. The user accesses the content items using the user interface 120. This environment allows the user to access content more easily than when the user must specify specific formats and take care of data transfers among devices. The system 100 provides an intelligent solution for delivery by automatically determining a solution that matches goals such as speed, cost, bandwidth usage, and CPU usage.

In one implementation, a user has purchased rights to various content items, such as songs, television shows, and movies. Some content items may have local data stored on the local media library 130 in a home network. Some content items may have remote data stored on one or more network servers 150 accessible through a wide area network (e.g., the Internet or cable network). Other content items may not have any content data yet provided in storage corresponding to the user, but only the rights have currently been acquired and provisioned to the user. Similarly, the rights information can be stored in various ways and places (e.g., a local library, a remote server, or a content provider). In one case, the user has established a rights domain defined by a set of registered users, devices, and/or relationships, such as in a local network and/or an extended network. The rights of the user are available throughout the domain and, based on those rights, copies may be moved and transformed among the devices to allow access from a device within the domain (or temporarily affiliated with the domain based on authentication).

In another implementation, when a user wants to access a particular item, such as to listen to a song or watch a movie, the user can use a network device (e.g., 170) to access the system 100 to view a library or list of content items for which the user has rights, but does not need to view format or location information. The user can select an item from the presented library and the system 100 will handle how to provide the appropriate data to meet the request of the user. In some cases the user can just make the simple request and the system 100 will fulfill the request based on what it calculates as the fastest and most efficient mechanism. In other cases, the user can specify parameters to guide the system 100 as to the priorities for determining the fulfillment method. For example, the user may plan to be offline and require a copy to ultimately reside on local storage thereby initiating a local copy or full download. In another case, the user may want instant access to watch a movie immediately thereby initiating a stream from a cloud service leaving no permanent copy locally.

For example, if the user requests to watch a movie on a media device (e.g., 170, 172), the system 100 determines how to provide a copy of the data for that movie to that device in a format that is compatible with the playback functionality of the device. In one implementation, the content routing system 100 can be implemented as a local media device (similar to device 172). There are various ways to fulfill the request and aspects to consider. For example, the format capabilities of the device, the storage capacity of the device, the formats and locations of available copies, the bandwidth capabilities of other devices for transferring data, the network topology and current traffic characteristics, the transform capabilities and speeds of devices, CPU utilization, desire for future offline usage, among others.

In one example, the media library manager 110 checks its local media library 130 to determine if a copy is already present on the device (e.g., 172) or the system 100 in the appropriate format. If the copy is present but not in the correct format, the system 100 determines its ability to transform the file to the appropriate format. It also calculates the processing time to transform the file locally and compares that with alternate methods of access such as local transfer if present or re-download from a cloud service. If not present, the media library manager 110 checks with other devices on the local network for the data. At the same time, the media library manager 110 notes available copies of the data in other formats as well. The media library manager 110 also checks with one or more designated servers (e.g. 150) for remote copies. After a series of queries, the media library manager 110 will have established where copies of the selected item's data are available and in what formats. The media library manager 110 then determines the best way to get the data in the proper format, such as the fastest way and/or the highest quality file. Other parameters for selecting a delivery method can be specified as part of the request.

In one variation, the content routing system 100 can also provide payment options to the user to balance against speed or quality (e.g., standard definition (SD) versus high definition (HD)). For example, the data can be delivered quickly for one price, more slowly for a lower price, or for free over a long period of time. Similarly the cost in terms of money, speed, and storage can also be balanced for transcoding or converting an existing copy from one format to another.

In one implementation, the content routing system 100 can also consider multiple step solutions, such as transferring the data from device A to device B and then transforming the data to a new format and finally providing the transformed data to the requesting device (e.g., 172). This solution may be faster than transforming at device A, or device A may not have the right transform capabilities or sufficient CPU power to perform transformation quickly. The system 100 resolves how to fulfill the request automatically, but can be configured to use certain weighting or to check for user preferences or confirmation at various levels of detail. In another implementation, the system 100 can consider or present the option of purchasing or renting an entirely new license and/or rights if appropriate. This option can be considered if it will be cheaper or faster, or when an existing license has or will shortly expire or if the user wanted to upgrade their rights from SD to HD for example.

In yet another implementation, the content routing system 100 may fulfill the request from a user itself or may communicate the request to another device (e.g., 170), to a server in a home network, or to a remote server that handles fulfillment resolution (e.g., 150). Some or all of the queries can also be resolved or avoided using tables of information about available copies and formats, which are possibly updated on a regular basis within the network. Thus, the tables can be stored on the media library manager 110, and used to resolve the queries.

In a further implementation, a peer-to-peer resolution is used where the devices in the rights domain query one another to determine status. In this implementation, the media library manager 110 accesses the peer media library manager 140 to handle fulfillment resolution. In this case, the requesting device (e.g., 172, or even content routing system 100) listens to the traffic or receives updates to determine the result. In another use of the peer-to-peer technology, when the data is available from multiple sources, a segmented downloading technique can be used to provide pieces of the data from multiple sources which are then reassembled at the receiving/requesting device. In another use of the peer-to-peer technology, authenticated sources from outside the domain can be included to provide access to the file in accordance with the user's rights.

In other implementations, the user can access a library that includes items for which the user does not yet have rights, such as from one or multiple merchants. The system 100 can then work with the device 170, 172 and the merchant system(s) to determine how to get the data for the selected item to the device in the appropriate format.

Figure 2:
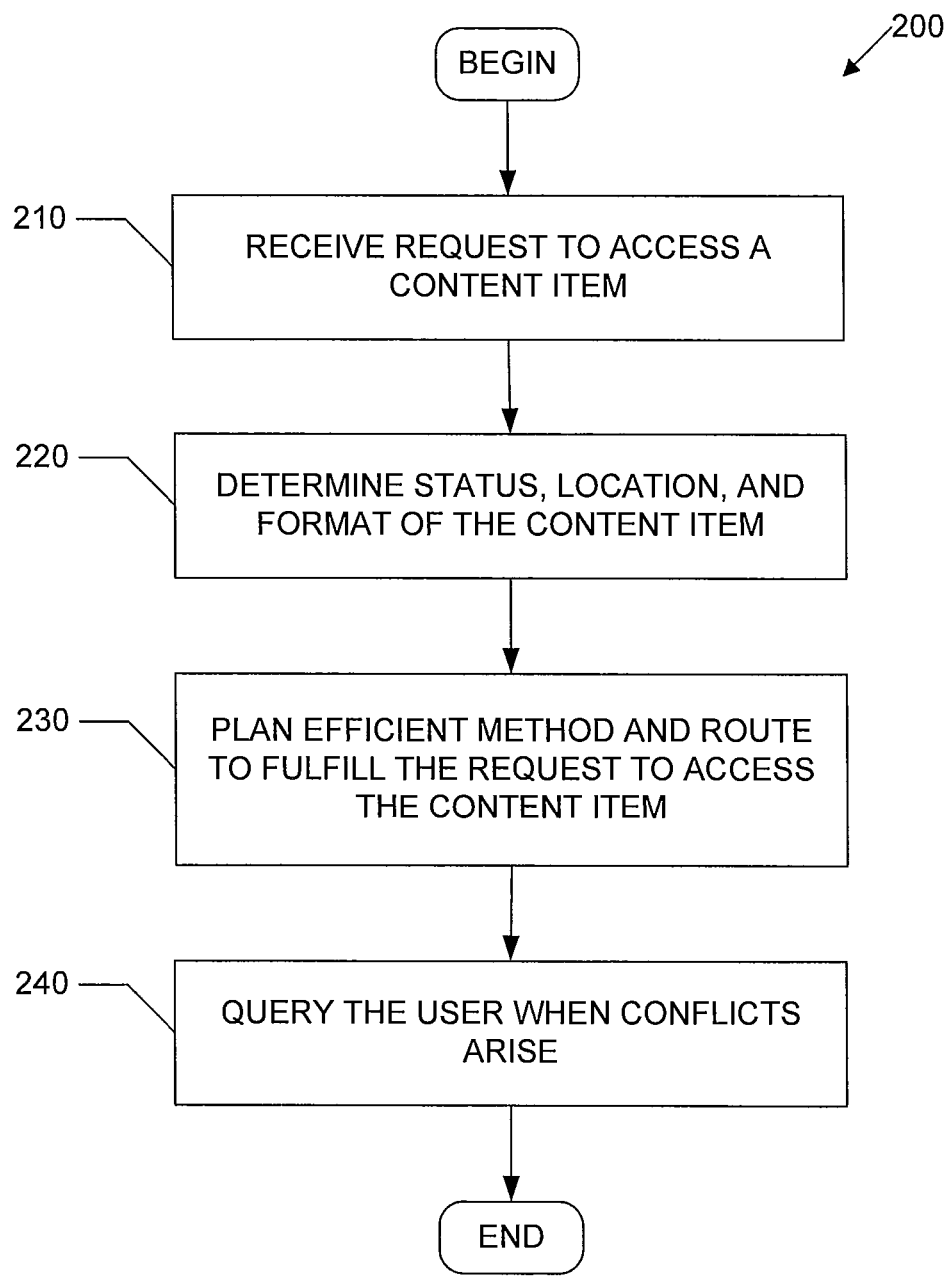
FIG. 2 is a flowchart illustrating a technique for efficient routing of content.

FIG. 2 is a flowchart 200 illustrating a technique for efficient routing of content. In one implementation, the routing technique is implemented on a content routing system (e.g., 100). When content is requested for access (e.g., for viewing) by a user, the request to access the content item is received, at box 210. At this point, the system selects the content among following: (1) a local copy; (2) trans-formatting a local copy between devices; (3) reacquiring a digital rights management (DRM) license to activate a local copy; or (4) downloading a new copy in a different format appropriate for a receiving device.

When the routing technique is implemented on a content routing system, a user can access content items through general requests and allow the system to manage fulfilling the request. This environment allows the user to access content more easily than when the user must specify specific formats and take care of data transfers among devices. Thus, the system provides an intelligent solution for delivery by automatically determining a solution that matches goals. For example, device capabilities, network channel characteristics (e.g., network traffic), status, location, and format of the content items are determined, at box 220. The status of the content items includes information or condition about the content items. The status can also include current state of the content items such as "being used", "being copied", or "locked". The location of the content items indicates where the files containing the content items can be found or indicates information such as local or remote. The format of the content items indicates the type of content items or representation of the content items to allow conversion from one to another.

In one implementation, a user has purchased rights to various content items, such as songs, television shows, and movies. Some content items may have local data stored on devices in a home network. Some content items may have remote data stored on one or more network servers accessible through a wide area network (e.g., the Internet or cable network). Other content items may not have any content data yet provided in storage corresponding to the user, but only the rights have currently been acquired and provisioned to the user.

Similarly, the rights information can be stored in various ways and places (e.g., a local library, a remote server, or a content provider). In one case, the user has established a rights domain defined by a set of registered users, devices, and/or relationships, such as in a local network and/or an extended network. The rights of the user are available throughout the domain and, based on those rights, copies may be moved and transformed among the devices to allow access from a device in the domain.

In another implementation, when a user wants to access a particular item, such as to listen to a song or watch a movie, the user can use a network device to access the system to view a library or list of content items for which the user has rights, but does not need to view format or location information. The user can select an item from the presented library and the system will handle how to provide the appropriate data to meet the request of the user.

For example, if the user requests to watch a movie on a device, then the system will determine how to provide streaming access or a copy of the data for that movie to the device in a format that is compatible with the playback functionality of the device. There are various ways to fulfill the request and aspects to consider. For example, the format capabilities of the device, the storage capacity of the device, the formats and locations of available copies, the bandwidth capabilities of other devices for transferring data, the network topology, the transform capabilities and speeds of devices, among others. Accordingly, the system can plan efficient method and route to fulfill the request to access the content item at box 230.

In one example, the device checks its local storage to determine if a copy is already present on the device in an appropriate format. If the copy is present but not in the correct format, the device determines its ability to transform the file to the appropriate format. It also calculates the processing time to transform the file locally and compares that with alternate methods of access such as local transfer if present or re-download from a cloud service. If the copy is not already present on the device, the device checks with other devices on the local network for the data. Moreover, the device notes available copies of the data in other formats as well. The device also checks with one or more designated servers for remote copies.

Referring to FIG. 3, which provides more detailed steps involved in the planning of efficient method and route to fulfill the request to access the content item (see box 230) as shown in FIG. 2, the location of a copy of the content is determined at box 300. After a series of queries, the device will have established the availability and formats of the data copies for the selected item. The device then determines the best way to get the data in the proper format, such as the fastest way and/or the highest quality file as shown in box 314. Other alternative methods and routes to fulfill the request to access the content item are shown in boxes 316 to 322. Thus, the methods and routes enumerated in boxes 316 to 322 can be executed in any order, and not all of the methods and routes need to be executed. The details of these alternative methods and routes are described below.

Other parameters for selecting a delivery method can be specified as part of the request. Thus, when the request specifies the delivery method (i.e., a yes answer to query in box 310), the specified delivery method is used, as in box 312. However, when conflicts and/or a need for resolution of issues arise, the user is queried, at box 240 as shown in FIG. 2, to provide a desirable fulfillment for the user. Additionally, user preferences can be captured in advance to provide pre-determined answers to queries when conflicts or issues arise thereby eliminating the need for user interaction during the operation.

In another implementation, payment options are provided to the user to balance against speed or quality (e.g., standard definition (SD) versus high definition (HD)). For example, the data can be delivered quickly for one price, more slowly for a lower price, or for free over a long period of time. Similarly the cost in terms of money, speed, and storage can also be balanced for transcoding or converting an existing copy from one format to another. The system can also consider multiple step solutions (see box 316), such as transferring the data from device A to device B and then transforming the data to a new format and finally providing the transformed data to the requesting device. This solution may be faster than transforming at device A, or device A may not have the right transform capabilities. The system resolves how to fulfill the request automatically, but can be configured to use certain weighting or to check for user confirmation at various levels of detail. Another option the system can consider or present is the option of purchasing or renting an entirely new license and/or rights if appropriate (see box 318). This option can be considered if it will be cheaper or faster, or when an existing license has or will shortly expire.

In yet another implementation, the device may fulfill the request from a user by itself or may communicate the request to another device, to a server in a home network, or to a remote server that handles fulfillment resolution (e.g., in the case where there is another machine on the local network more suited to do the transformation due to higher CPU capability). Some or all of the queries can also be resolved or avoided using tables of information about available copies and formats (see box 320), which are possibly updated on a regular basis within the network.

In other implementations, a peer-to-peer resolution (see box 322) is used where the devices in the rights domain query one another to determine status. In one case, the requesting device or designated device listens to the traffic or receives updates to determine the result. In another case, when the data is available from multiple sources, a segmented downloading technique can be used to provide pieces of the data from multiple sources which are then reassembled at the receiving/requesting device.

Figure 4A:
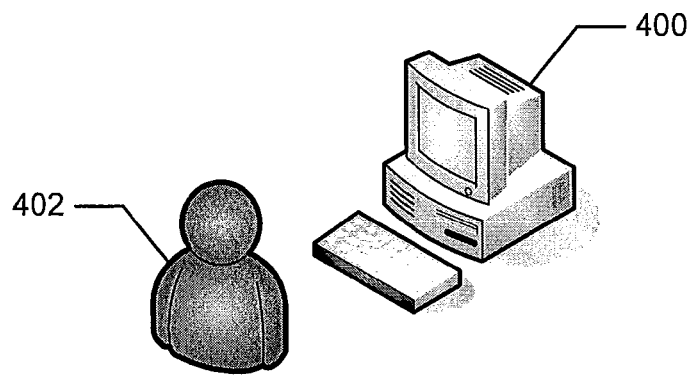
FIG. 4A illustrates a representation of a computer system and a user.

FIG. 4A illustrates a representation of a computer system 400 and a user 402. The user 402 uses the computer system 400 which performs content routing. The computer system 400 stores and executes a content routing system 490.

Figure 4B:
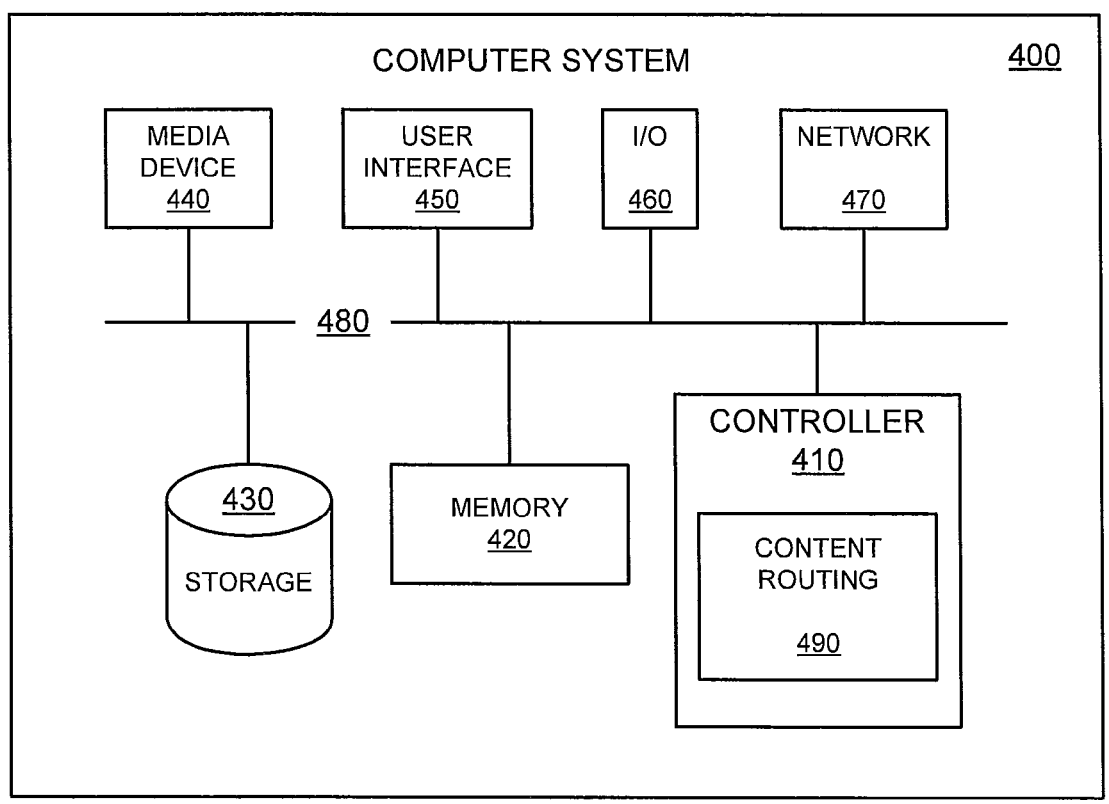
FIG. 4B is a functional block diagram illustrating the computer system hosting a content routing system.

FIG. 4B is a functional block diagram illustrating the computer system 400 hosting the content routing system 490. The controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the content routing system 490 as a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data temporarily or long term for use by other components of the computer system 400, such as for storing data used by the content routing system 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user. In one implementation, the user interface 450 includes a keyboard, a mouse, audio speakers, and a display. The controller 410 uses input from the user to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 402.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus 480 or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of routing content, comprising:
   receiving a request to access a content item from a media device;
   determining at least one of status, location, and format of the content item;
   planning a procedure to fulfill the request to access the content item; and
   enabling the content item to be accessed in accordance with the procedure, wherein the procedure includes one of:
   selecting a local copy of the content item;
   trans-formatting and selecting the local copy of the content item;
   re-acquiring a digital rights management license to activate the local copy; or
   downloading a new copy in a different format appropriate for the media device.

2. The method of claim 1, wherein the status of the content item includes one of being used, being copied, or locked.

3. The method of claim 1, wherein the location of the content item is one of local or remote.

4. The method of claim 1, wherein the content item comprises at least one of songs, television shows, and movies.

5. The method of claim 1, wherein the content item comprises local data stored on a device in a home network.

6. The method of claim 1, wherein the content item comprises remote data stored on one or more network servers accessible through a wide area network.

7. The method of claim 1, further comprising
   determining at least one of device capabilities and network channel characteristics.

8. The method of claim 1, further comprising
   determining at least one of:
   a storage capacity of the device;
   a network topology;
   bandwidth capabilities of other devices for transferring data; and
   transform capabilities and speeds of devices.

9. The method of claim 1, wherein the request includes a specified method for delivering the requested content item, and the procedure includes delivering the requested content item by automatically determining a solution that matches the specified method with efficient speed, cost, bandwidth usage, and CPU usage.

10. The method of claim 1, further comprising
    querying a user when conflicts or a need for resolution of issues arise.

11. The method of claim 1, further comprising
    providing payment options to a user to balance against speed or quality.

12. The method of claim 1, further comprising
    providing options to purchase or rent an entirely new license or rights.

13. The method of claim 1, further comprising
    using a peer-to-peer technology where devices in a rights domain query one another to determine status.

14. The method of claim 13, wherein the peer-to-peer technology provides segmented downloading when the data is available from multiple sources.

15. A content routing system, comprising:
    a user interface;
    a local media library; and
    a media library manager configured to:

receive a request from a media device using the user interface to access a content item;

determine at least one of status, location, and format of the content item;

plan a procedure to fulfill the request to access the content item; and enable the content item to be accessed in accordance with the procedure, wherein the procedure includes one of:
  selecting a local copy of the content item;
  trans-formatting and selecting the local copy of the content item;
  re-acquiring a digital rights management license to activate the local copy; or
  downloading a new copy in a different format appropriate for the media device.

16. The system of claim 15, wherein the media library manager is implemented as a local media player and a library management software application within the local media player.

17. The system of claim 15, wherein the status of the content item includes one of being used, being copied, or locked.

18. The system of claim 15, wherein the location of the content item is one of local or remote.

19. The system of claim 15, wherein the user accesses the content item using a network device to view a library or list of content items for which the user has rights.

20. A non-transitory computer-readable storage medium storing a computer program for automatically routing content, the computer program comprising executable instructions that cause a computer to:

receive a request to access a content item from a media device;

determine at least one of status, location, and format of the content item;

plan a procedure to fulfill the request to access the content item; and enable the content item to be accessed in accordance with the procedure, wherein the procedure includes one of:
  selecting a local copy of the content item;
  trans-formatting and selecting the local copy of the content item;
  re-acquiring a digital rights management license to activate the local copy; or
  downloading a new copy in a different format appropriate for the media device.

* * * * *